United States Patent
Kim et al.

(10) Patent No.: US 11,842,856 B2
(45) Date of Patent: Dec. 12, 2023

(54) MULTILAYER ELECTRONIC COMPONENT

(71) Applicant: SAMSUNG ELECTRO-MECHANICS CO., LTD., Suwon-si (KR)

(72) Inventors: Hye Won Kim, Suwon-si (KR); Won Kuen Oh, Suwon-si (KR); Chae Dong Lee, Suwon-si (KR); Og Soon Kim, Suwon-si (KR); Jung Won Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 100 days.

(21) Appl. No.: 17/707,384

(22) Filed: Mar. 29, 2022

(65) Prior Publication Data
US 2023/0215649 A1    Jul. 6, 2023

(30) Foreign Application Priority Data

Dec. 31, 2021 (KR) .......................... 10-2021-0194081

(51) Int. Cl.
*H01G 4/30* (2006.01)
*H01G 4/12* (2006.01)
*H01G 4/012* (2006.01)
*H01G 4/008* (2006.01)

(52) U.S. Cl.
CPC ............. *H01G 4/30* (2013.01); *H01G 4/008* (2013.01); *H01G 4/012* (2013.01); *H01G 4/12* (2013.01)

(58) Field of Classification Search
CPC .......... H01G 4/30; H01G 4/008; H01G 4/012; H01G 4/12
See application file for complete search history.

(56) References Cited

U.S. PATENT DOCUMENTS

| | | | |
|---|---|---|---|
| 6,205,015 B1* | 3/2001 | Wada .................. | C04B 35/4682 423/598 |
| 2013/0050896 A1* | 2/2013 | Park ....................... | H01G 4/228 361/321.1 |
| 2014/0204502 A1* | 7/2014 | Chun ...................... | H01G 4/30 361/301.4 |
| 2014/0347783 A1* | 11/2014 | Kisumi ................ | H01G 4/0085 427/79 |
| 2015/0041196 A1* | 2/2015 | Kim ..................... | H01G 4/2325 361/301.4 |
| 2015/0085422 A1* | 3/2015 | Kim ..................... | H01G 4/2325 156/89.18 |

(Continued)

FOREIGN PATENT DOCUMENTS

| JP | 2020-061468 A | 4/2020 |
|---|---|---|
| KR | 10-2014-0095361 A | 8/2014 |
| KR | 10-2017-0000768 A | 1/2017 |

*Primary Examiner* — Michael P McFadden
(74) *Attorney, Agent, or Firm* — Morgan, Lewis & Bockius LLP

(57) ABSTRACT

A multilayer electronic component includes a body including a dielectric layer and internal electrodes and external electrodes disposed on the body and connected to the internal electrodes, wherein the external electrodes include a first electrode layer disposed on the body and including Cu and glass, a second electrode layer disposed on the first electrode layer and including Ni and Cu, and a third electrode layer disposed on the second electrode layer and including Ni and glass.

20 Claims, 7 Drawing Sheets

(56) References Cited

U.S. PATENT DOCUMENTS

| | | | |
|---|---|---|---|
| 2016/0379758 A1 | 12/2016 | Otani | |
| 2017/0032896 A1* | 2/2017 | Otani | H01G 4/30 |
| 2019/0355518 A1* | 11/2019 | Harada | H01G 4/30 |
| 2020/0111615 A1* | 4/2020 | Kim | H01G 4/12 |
| 2020/0118761 A1 | 4/2020 | Terashita et al. | |
| 2022/0102079 A1* | 3/2022 | Kitahara | H01G 4/30 |

* cited by examiner

MULTILAYER ELECTRONIC COMPONENT

CROSS-REFERENCE TO RELATED APPLICATION

This application claims benefit of priority to Korean Patent Application No. 10-2021-0194081 filed on Dec. 31, 2021 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

The MLCC, which is advantageously compact, ensures high capacitance, facilitates mounting, may be used as a component of various types of electronic devices. As various electronic devices such as computers and mobile devices have been miniaturized and have high power, demand for miniaturization and high capacitance of multilayer ceramic capacitors has increased.

In addition, as industry interest in automotive electronic components has recently increased, multilayer ceramic capacitors are also required to have high reliability characteristics to be used in automobiles or infotainment systems.

From the point of view of external electrodes, it is very important to implement a thin film guaranteeing hermetic sealing and to improve moisture resistance to prevent penetration of foreign matter, moisture and gas into chips.

When moisture resistance characteristics are not sufficiently secured, bonding force between internal electrodes and a dielectric layer may be lowered, and problems such as an increase in a short-circuit rate, the occurrence of cracks, and deterioration of insulation resistance (IR) may occur.

As one of the main causes of deterioration of moisture resistance, if hydrogen gas occurring during a plating process penetrates into an element, the insulation resistance of the dielectric layer may deteriorate when a voltage is applied.

Therefore, there is a need for a method for preventing inflow of hydrogen into a chip.

SUMMARY

An aspect of the present disclosure may provide a multilayer electronic component having improved reliability.

According to an aspect of the present disclosure, a multilayer electronic component may include: a body including a dielectric layer and internal electrodes; and external electrodes disposed on the body and connected to the internal electrodes, wherein the external electrodes include a first electrode layer disposed on the body and including Cu and glass, a second electrode layer disposed on the first electrode layer and including Ni and Cu, and a third electrode layer disposed on the second electrode layer and including Ni and glass.

According to an aspect of the present disclosure, a multilayer electronic component may include: a body including a dielectric layer and internal electrodes; and external electrodes disposed on the body and connected to the internal electrodes, wherein the external electrodes include a first electrode layer disposed on the body and including Cu, a second electrode layer disposed on the first electrode layer and including Ni and Cu, and a third electrode layer disposed on the second electrode layer and including Ni and glass.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
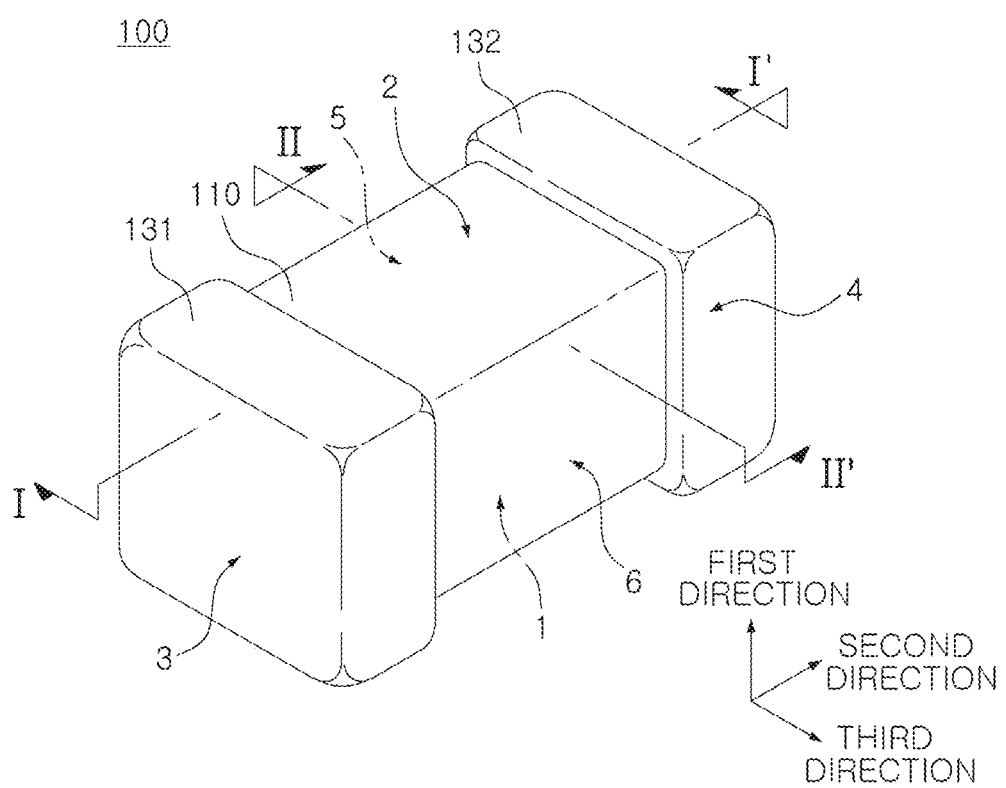
FIG. 1 is a perspective view schematically illustrating a multilayer electronic component according to an exemplary embodiment in the present disclosure.

Exemplary embodiments of the present disclosure will now be described in detail with reference to the accompanying drawings.

In the drawings, a first direction may be defined as a thickness (T) direction, a second direction may be defined as a length (L) direction, and a third direction may be defined as a width (W) direction.

FIG. 1 is a perspective view schematically illustrating a multilayer electronic component according to an exemplary embodiment in the present disclosure.

Figure 2:
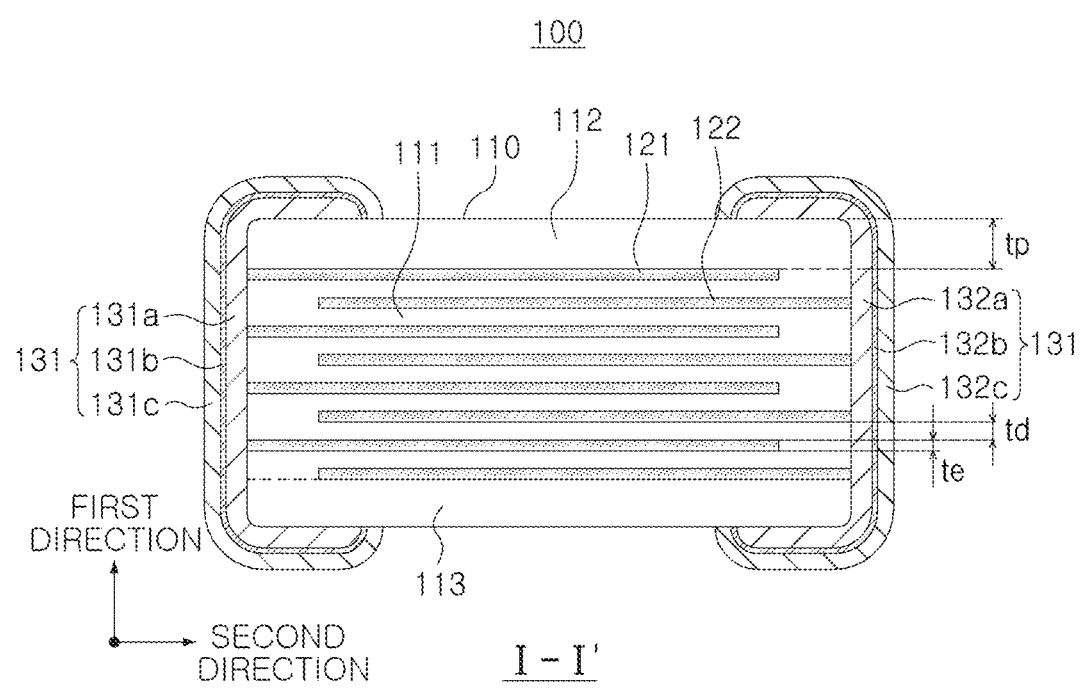
FIG. 2 is a cross-sectional view taken along line I-I' of FIG. 1.

FIG. 2 is a cross-sectional view taken along line I-I' of FIG. 1.

Figure 3:
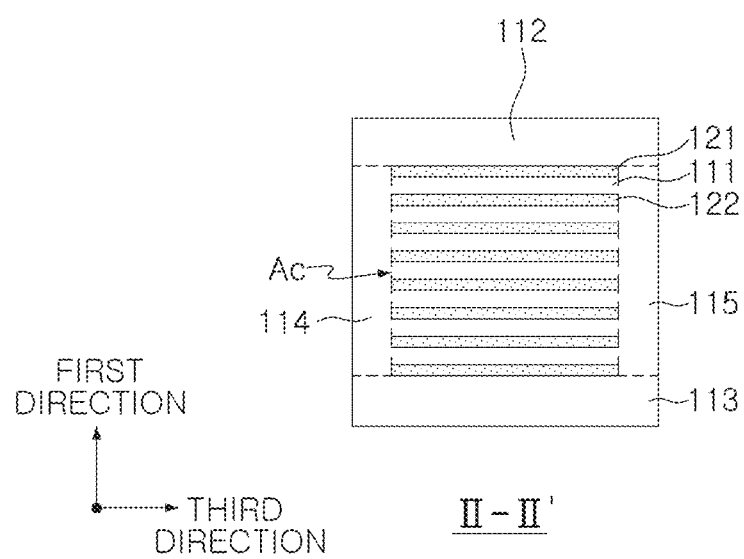
FIG. 3 is a cross-sectional view taken along line II-II' of FIG. 1.

FIG. 3 is a cross-sectional view taken along line II-II' of FIG. 1.

Figure 4:
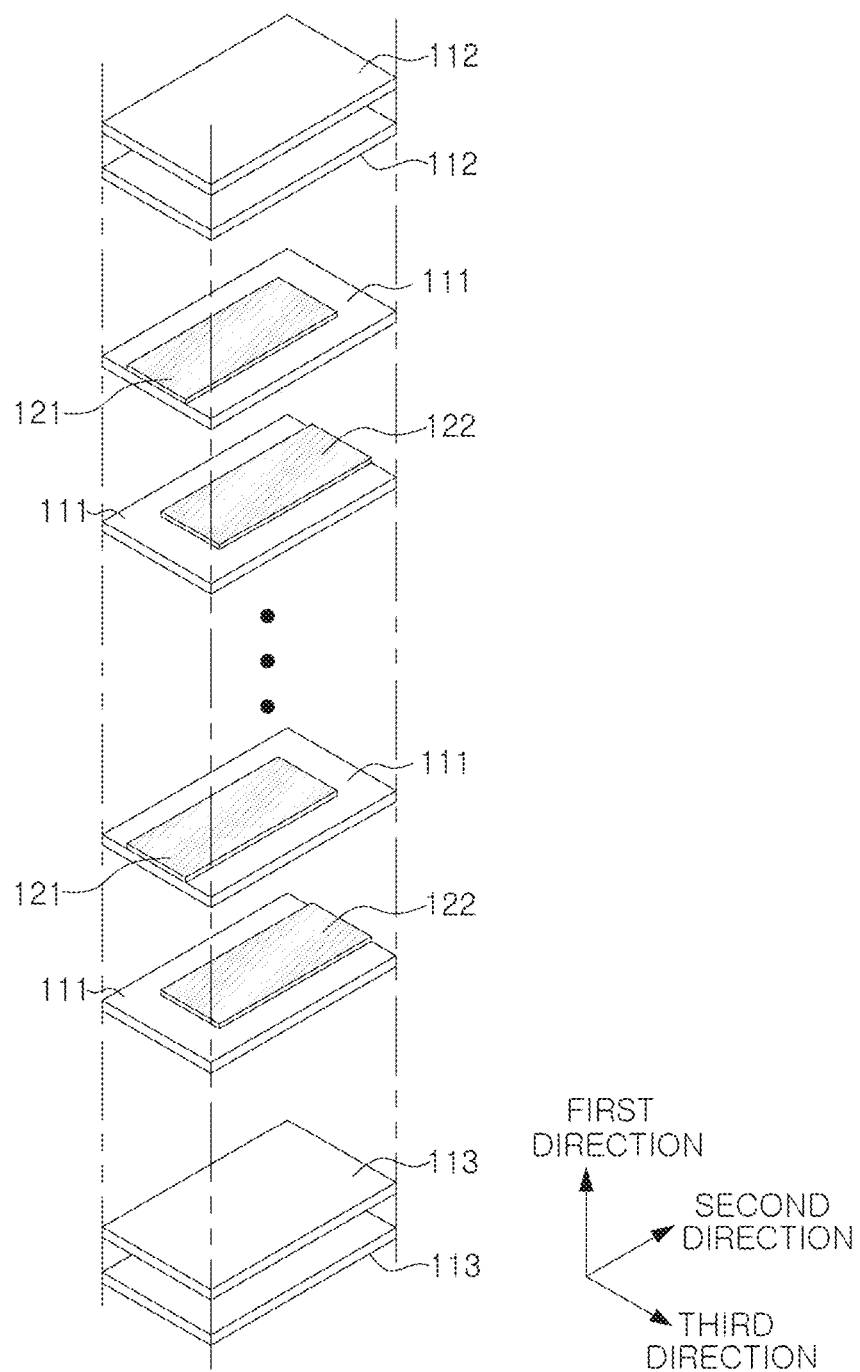
FIG. 4 is an exploded perspective view schematically illustrating an exploded body of FIG. 1.

FIG. 4 is an exploded perspective view schematically illustrating an exploded body of FIG. 1.

Hereinafter, a multilayer electronic component 100 according to an exemplary embodiment in the present disclosure will be described in detail with reference to FIGS. 1 to 4.

A multilayer electronic component 100 according to an exemplary embodiment in the present disclosure may include a body 110 including a dielectric layer 111 and internal electrodes 121 and 122 and external electrodes 131 and 132 disposed on the body and connected to the internal electrodes, wherein the external electrodes include first electrode layers 131a and 132a disposed on the body and including Cu and glass, second electrode layers 131b and 132b disposed on the first electrode layers and including Ni and Cu, and third electrode layers 131c and 132c disposed on the second electrode layers and including Ni and glass.

In the body 110, the dielectric layer 111 and the internal electrodes 121 and 122 are alternately stacked.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM).

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1).

As a material for forming the dielectric layer 111, various ceramic additives, organic solvents, plasticizers, binders, dispersants, etc. May be added to the powder particles such as barium titanate ($BaTiO_3$) according to purposes of the present disclosure.

Meanwhile, an average thickness td of the dielectric layer 111 does not need to be particularly limited.

However, when the dielectric layer is generally formed to be thin to have a thickness less than 0.6 μm, in particular, when the thickness of the dielectric layer is 0.35 μm or less, there is a risk that reliability may decrease.

According to an exemplary embodiment in the present disclosure, as the second electrode layers 131b and 132b include Ni and Cu, a plating solution, moisture, hydrogen, etc., are prevented from penetrating into the body 110 to improve reliability, and therefore, excellent reliability may be ensured even when an average thickness of the dielectric layer 111 is 0.35 μm or less.

Therefore, when the average thickness of the dielectric layer 111 is 0.35 μm or less, the reliability improvement effect according to the present disclosure may be more remarkable.

The average thickness td of the dielectric layer 111 may refer to an average thickness of the dielectric layer 111 disposed between the first and second internal electrodes 121 and 122.

The average thickness of the dielectric layer 111 may be measured by scanning an image of a cross-section of the body 110 in a length-thickness direction (L-T) with a scanning electron microscope (SEM) having a magnification of 10,000. More specifically, an average value may be measured by measuring a thickness of one dielectric layer at 30 points at equal intervals in a length direction in the scanned image. The 30 points at equal intervals may be designated in the capacitance forming portion Ac. In addition, if the average value is measured by extending the measurement of the average value to 10 dielectric layers, the average thickness of the dielectric layer may be further generalized.

The body 110 may include the capacitance forming portion Ac disposed inside the body 110 and forming capacitance by including the first internal electrode 121 and the second internal electrode 122 disposed to face each other with the dielectric layer 111 interposed therebetween and cover portions 112 and 113 formed on upper and lower surface of the capacitance forming portion Ac in the first direction.

In addition, the capacitance forming portion Ac is a part contributing to capacitance formation of the capacitor, and may be formed by repeatedly stacking the plurality of first and second internal electrodes 121 and 122 with the dielectric layer 111 interposed therebetween.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the average thickness of the cover portions 112 and 113 does not need to be particularly limited. However, the average thickness tp of the cover portions 112 and 113 may be 15 μm or less in order to more easily achieve miniaturization and implement high capacitance in the multilayer electronic component. Meanwhile, the average thickness of the cover portions 112 and 113 does not need to be particularly limited. However, the average thickness tp of the cover portions 112 and 113 may be 15 μm or less in order to more easily achieve miniaturization and high capacitance of the multilayer electronic component. In addition, according to an exemplary embodiment in the present disclosure, as the second electrode layers 131b and 132b include Ni and Cu, a plating solution, moisture, hydrogen, etc. are prevented from penetrating into the body 110 to improve reliability. Therefore, excellent reliability may be ensured even when the average thickness tp of the cover portions 112 and 113 is 15 μm or less.

The average thickness tp of the cover portions 112 and 113 may refer to a size in the first direction and may be a value obtained by averaging sizes of the cover portions 112 and 113 in the first direction measured at five points at equal intervals above or below the capacitance forming portion Ac.

In addition, margin portions 114 and 115 may be disposed on a side surface of the capacitance forming portion Ac.

The margin portions 114 and 115 may include a margin portion 114 disposed on the fifth surface 5 of the body 110 and a margin portion 115 disposed on the sixth surface 6 of the body 110. That is, the margin portions 114 and 115 may be disposed on both end surfaces of the ceramic body 110 in the width direction.

As shown in FIG. 3, the margin portions 114 and 115 may refer to a region between both ends of the first and second internal electrodes 121 and 122 and a boundary surface of the body 110 in a cross-section taken in the width-thickness (W-T) direction of the body 110.

The margin portions 114 and 115 may basically serve to prevent damage to the internal electrodes due to physical or chemical stress.

The margin portions 114 and 115 may be formed as the internal electrodes are formed by applying a conductive paste on a ceramic green sheet excluding a region where the margin portions are to be formed.

In addition, in order to suppress a step difference due to the internal electrodes 121 and 122, the margin portions 114 and 115 may be formed by cutting the internal electrodes to be exposed to the fifth and sixth surfaces 5 and 6 of the body after stacking and subsequently stacking a single dielectric layer or two or more dielectric layers on both side surfaces of the capacitance forming portion Ac in the third direction (the width direction).

Meanwhile, the widths of the margin portions 114 and 115 do not need to be particularly limited. However, the average widths of the margin portions 114 and 115 may be 15 μm or less in order to more easily achieve miniaturization and high capacitance of the multilayer electronic component. In addition, according to an exemplary embodiment in the present disclosure, as the second electrode layers 131b and 132b include Ni and Cu, a plating solution, moisture, hydrogen, etc. may be prevented from penetrating into the body 110 to improve reliability. Therefore, excellent reliability may be secured even when the average widths of the margin portions 114 and 115 are 15 μm or less.

The average width of the margin portions 114 and 115 may refer to an average size of the margin portions 114 and 115 in the third direction, and may be a value obtained by averaging sizes of the margin portions 114 and 115 measured at five points at equal intervals in the third direction on a side surface of the capacitance forming portion Ac.

The internal electrodes 121 and 122 are alternately stacked with the dielectric layer 111

The internal electrodes 121 and 122 may include first and second internal electrodes 121 and 122. The first and second internal electrodes 121 and 122 may be alternately disposed to face each other with the dielectric layer 111 constituting the body 110 interposed therebetween and may be exposed to the third and fourth surfaces 3 and 4 of the body 110, respectively.

The first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body to be connected to the first internal electrode 121, and a second external electrode 132 may be is disposed on the fourth surface 4 of the body to be connected to the second internal electrode 122.

That is, the first internal electrode 121 is not connected to the second external electrode 132 but is connected to the first external electrode 131, and the second internal electrode 122 is not connected to the first external electrode 131 but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically separated from each other by the dielectric layer 111 disposed therebetween.

The body 110 may be formed by alternately stacking a ceramic green sheet on which the first internal electrode 121 is printed and a ceramic green sheet on which the second internal electrode 122 is printed and subsequently firing the green sheets.

A material for forming the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. As a printing method of the conductive paste for internal electrodes, a screen printing method or a gravure printing method may be used but the present disclosure is not limited thereto.

Meanwhile, the average thickness to of the internal electrodes 121 and 122 does not need to be particularly limited.

However, in general, when the internal electrodes are formed to be thin to have a thickness less than 0.6 μm, in particular, when the thickness of the internal electrode is 0.35 μm or less, there is a risk that reliability may be deteriorated.

According to an exemplary embodiment in the present disclosure, as the second electrode layers 131b and 132b include Ni and Cu, a plating solution, moisture, hydrogen, etc, are prevented from penetrating into the body 110 to improve reliability. Therefore, excellent reliability may be ensured even when the average thickness of the internal electrodes 121 and 122 is 0.35 μm or less.

Accordingly, when the internal electrodes 121 and 122 have the average thickness of 0.35 μm or less, the effect according to the present disclosure may be more remarkable, and miniaturization and high capacitance of the ceramic electronic component may be more easily achieved.

The average thickness to of the internal electrodes 121 and 122 may refer to an average thickness of the internal electrodes 121 and 122.

The average thickness of the internal electrodes 121 and 122 may be measured by scanning an image of a cross-section of the body 110 in the length-thickness direction (L-T) with a scanning electron microscope (SEM) having a magnification of 10,000. More specifically, the average value may be measured by measuring a thickness of one internal electrode at 30 equal intervals in the length direction in the scanned image. The 30 points at equal intervals may be designated in the capacitance forming portion Ac. In addition, if the average value is measured by extending the measurement of the average value to 10 internal electrodes, the average thickness of the internal electrodes may be further generalized.

The external electrodes 131 and 132 may be disposed on the third surface 3 and the fourth surface 4 of the body 110. The external electrodes 131 and 132 may include first and second external electrodes 131 and 132 disposed on the third and fourth surfaces 3 and 4 of the body 110, respectively, and connected to the first and second internal electrodes 121 and 122, respectively.

In the present exemplary embodiment, a structure in which the multilayer electronic component 100 has two external electrodes 131 and 132 is described, but the number and shape of the external electrodes 131 and 132 may be changed according to a shape of the internal electrodes 121 and 122 or for other purposes.

The external electrodes 131 and 132 may include first electrode layers 131a and 132a disposed on the body 110 and including Cu and glass, second electrode layers 131b and 132b disposed on the first electrode layers and including Ni and Cu, and third electrode layers 131c and 132c disposed on the second electrode layers and including Ni and glass.

In a related art, external electrodes are formed as fired electrodes including Cu and glass, so that Cu of the external electrodes are diffused into Ni of the internal electrode in a region in which the internal electrodes and the external electrodes are in contact with each other during a sintering process to form a Cu—Ni alloy, thereby securing electrical connectivity and suppressing penetration of a plating solution, hydrogen, etc to secure moisture resistance reliability.

However, except for the region in which the internal electrodes and the external electrodes are in contact with each other, it may be difficult to form a Cu—Ni alloy, so the effect of suppressing hydrogen penetration may be insufficient, and if Cu of the external electrodes is excessively diffused into the internal electrodes due to a difference in diffusion coefficient between the two metals and an increase in stress due to Cu diffusion.

According to the present disclosure, since the second electrode layers 131b and 132b disposed on the first electrode layers 131a and 132a include Ni and Cu, a plating solution, moisture, hydrogen, etc. may be reliably suppressed and the occurrence of radiation cracks etc. as in the related art may be suppressed.

As Cu is included in the first electrode layers 131a and 132a and Ni is included in the third electrode layer, Cu of the first electrode layers 131a and 132a may be diffused to the third electrode layers 131c and 132c during the firing process of forming the external electrodes to form the second electrode layers 131b and 132b including Cu and Ni. A method of implementing the structure of the external electrodes 131 and 132 of the present disclosure does not need to be particularly limited. As a specific example, the structure of the external electrodes 131 and 132 of the present disclosure may be implemented by applying a paste including Cu and glass on the body 110 and then applying the paste including Ni and glass and firing the paste. In some embodiments, the first and third electrode layers may not contain Sn, resin, or both. In this case, the firing conditions are not particularly limited, but as a preferred example, the second electrode layers 131b and 132b may be formed by heat treatment at a temperature of 700° C. or higher for 1 hour or longer.

The second electrode layers 131b and 132b may be more easily formed when Cu is included in the first electrode layers 131a and 132a and Ni is included in the third electrode layers 131c and 132c than when Ni is included in the first electrode layers 131a and 132a and Cu is included in the third electrode layers 131c and 132c. This is because Cu and Ni have different reaction rates, and diffusion generally occurs in a direction from Cu to Ni during alloy formation to form an alloy.

The second electrode layers 131b and 132b may serve as a barrier to prevent penetration of a plating solution, moisture, hydrogen, and the like. In particular, the second electrode layers 131b and 132b may fundamentally block penetration of hydrogen, which is a cause of insulation resistance (IR) deterioration, to the outside of the first electrode layers 131a and 132a, thereby remarkably improving the high-temperature insulation resistance. In addition, even if partial non-plating occurs on the external electrodes 131 and 132, the second electrode layers 131b and 132b may prevent solder from penetrating into the first electrode layers 131a and 132a and secure a protective film effect to protect the body 110 and the first electrode layers 131a and 132a from external thermal and chemical shocks.

In an exemplary embodiment, an average thickness of the second electrode layers 131b and 132b may be 1 μm or more and 10 μm or less.

If the average thickness of the second electrode layers 131b and 132b is less than 1 μm, breakage of the second electrode layer may occur and coverage of the first electrode layers 131a and 132a may be lowered and the effect of suppressing penetration of a plating solution, moisture, hydrogen, etc. may be insufficient.

Meanwhile, if the average thickness of the second electrode layers 131b and 132b is more than 10 μm, the thickness of the external electrode may be too thick, so that capacitance per unit volume may be reduced, stress applied to the chip may increase to decrease flexural strength, and equivalent series resistance (ESR) may increase.

The average thickness of the second electrode layers 131b and 132b may be measured by observing a cross-section cut in the first and second directions in the center in the third direction, and may be a value obtained by averaging thicknesses of the second electrode layers 131b and 132b measured from 5 points at equal intervals disposed on the capacitance forming portion Ac in the second direction.

In an exemplary embodiment, the sum of the mole numbers of Ni atoms and Cu atoms against a total mole numbers of atoms constituting the second electrode layers 131b and 132b may be 0.95 or more. That is, the second electrode layers 131b and 132b may be substantially formed of Cu and Ni, except for elements detected as impurities.

In this case, the components of the second electrode layers 131b and 132b may be calculated from an image observed using scanning electron microscope-energy dispersive X-ray spectroscopy (SEM-EDS). Specifically, after the multilayer electronic component is polished to a central position in the width direction (third direction) to expose a cross-section (L-T cross-section) in the length direction and thickness direction, the mole numbers of each element included in the second electrode layers may be measured using the EDS in a central region among regions obtained by dividing the second electrode layers into 5 equal parts in the thickness direction.

In an exemplary embodiment, the second electrode layers 131b and 132b may include a Cu—Ni alloy. That is, Cu and Ni included in the second electrode layer may be included in the form of a Cu—Ni alloy.

The Cu—Ni alloy not only has corrosion resistance to the plating solution, but also has a characteristic that hydrogen is difficult to permeate, and thus, the effect of suppressing penetration of the plating solution, hydrogen, etc. may be improved.

In this case, the Cu—Ni alloy included in the second electrode layers 131b and 132b may be one or more of $Cu_{0.3}Ni_{0.7}$, $Cu_{0.5}Ni_{0.5}$, $Cu_{0.7}Ni_{0.3}$, and $Cu_{0.9}Ni_{0.1}$.

Figure 5:
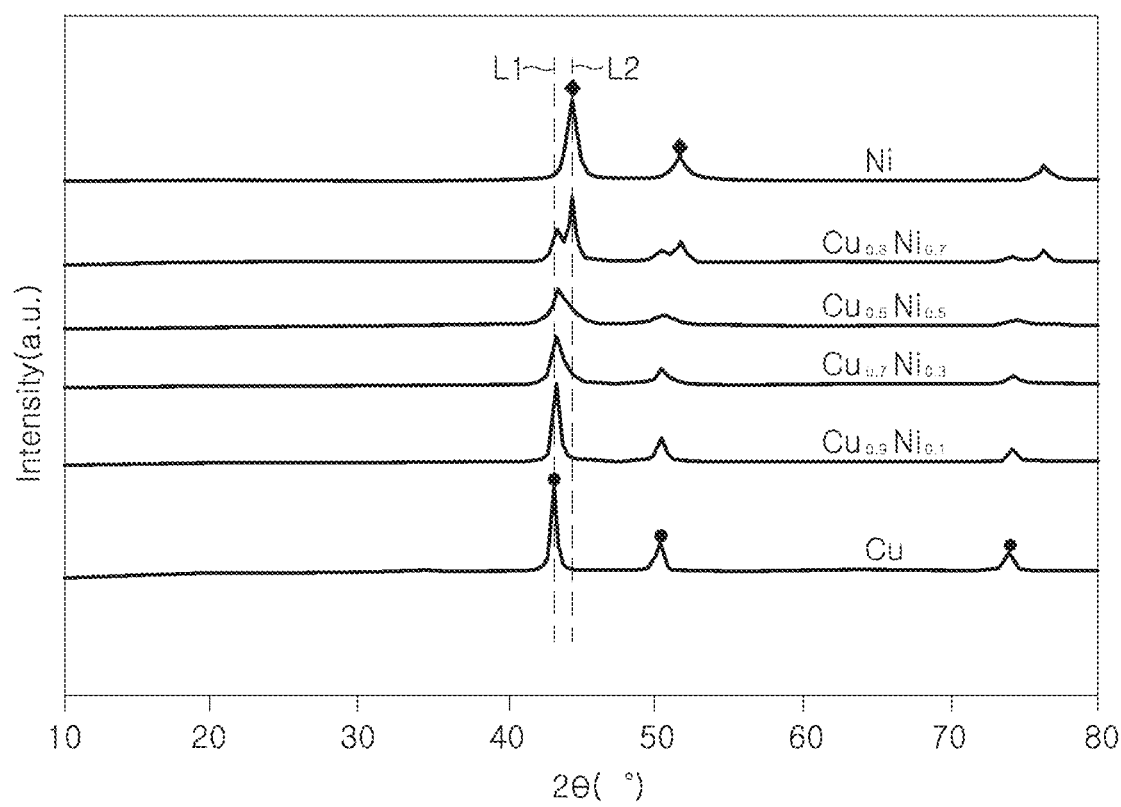
FIG. 5 is a graph illustrating peaks of Cu, Ni, and alloys thereof observed using micro X-ray diffraction.

FIG. 5 is a graph of observing the peaks of Cu, Ni, and alloys thereof using micro X-ray diffraction. Referring to FIG. 5, it can be seen that maximum peaks of $Cu_{0.3}Ni_{0.7}$, $Cu_{0.5}Ni_{0.5}$, $Cu_{0.7}Ni_{0.3}$, and $Cu_{0.9}Ni_{0.1}$ appear between a maximum peak of Cu (L1) and a maximum peak of Ni (L2).

Accordingly, as the second electrode layers 131b and 132b include one or more of $Cu_{0.3}Ni_{0.7}$, $Cu_{0.5}Ni_{0.5}$, $Cu_{0.7}Ni_{0.3}$, and $Cu_{0.9}Ni_{0.1}$, the maximum peak of the second electrode layers 131b and 132b may exist between the maximum peak of Cu and the maximum peak of Ni, when analyzed by XRD.

In an exemplary embodiment, an alloy including Cu and Ni may be disposed in a region in which the first electrode layers 131a and 132a and the internal electrodes 121 and 122 are in contact with each other. Cu included in the first electrode layers 131a and 132a may diffuse to the internal electrode to form an alloy including Cu and Ni in a region in contact with the internal electrode, and thus reliability may be further improved.

In an exemplary embodiment, in observing from the cross-section of the multilayer electronic component 100 in the second and third directions, when a total length of the first electrode layer at the boundary between the first electrode layers 131a and 132a and the second electrode layers 131b and 132b is E1 and a total length of the second electrode layer is E2, an average value of E2/E1 may be 0.9 or more. When E1 and E2 have the same value, it may be considered that the second electrode layer completely covers the first electrode layer, and when E2 has a value smaller than E1, it may be considered that the second electrode layer partially covers the first electrode layer. When the average value of E2/E1 is less than 0.9, the effect of suppressing penetration of the plating solution, moisture, hydrogen, etc. by the second electrode layer may be insufficient.

At this time, the average value of E2/E1 may be a value obtained by averaging E2/E1 values measured in a cross-section (L-T section) of the body 110 cut in the first and second directions at five points at equal intervals in the third direction.

In an exemplary embodiment, the average thickness of the third electrode layers 131c and 132c may be greater than the average thickness of the first electrode layers 131a and 132a. Since a diffusion coefficient of Cu included in the first electrode layers 131a and 132a is greater than a diffusion coefficient of Ni included in the third electrode layers 131c and 132c, the second electrode layers 131b and 132b may be more easily implemented than in a case in which the third electrode layers 131c and 132c are thicker than the first electrode layers 131a and 132a. More preferably, the average thickness of the third electrode layers 131c and 132c may be 1.1 times or more and 1.5 times or less the average thickness of the first electrode layers 131a and 132a. If the average thickness of the third electrode layers 131c and 132c is less than 1.1 times the average thickness of the first electrode layers 131a and 132a, the effect of easily forming the second electrode layers 131b and 132b may be insufficient, and if the average thickness of the third electrode layers 131c and 132c is more than 1.5 times, the capacitance per unit volume may decrease or ESR may increase.

As a specific example, the average thickness of the first electrode layers 131a and 132a may be 6 to 10 μm, and the third electrode layers 131c and 132c may be determined within a range of 1.1 times or more and 1.5 times or less of the average thickness of the first electrode layers 131a and 132a.

The average thickness of the first electrode layers 131a and 132a and the average thickness of the third electrode layers 131c and 132c may be measured by observing a cross-section cut in the first and second directions from the center in the third direction, and may be values obtained by averaging the thickness of the first electrode layers 131a and 132a and the thickness of the third electrode layers 131c and 132c measured at five points at equal intervals disposed on the capacitance forming portion Ac in the second direction.

Figure 6:
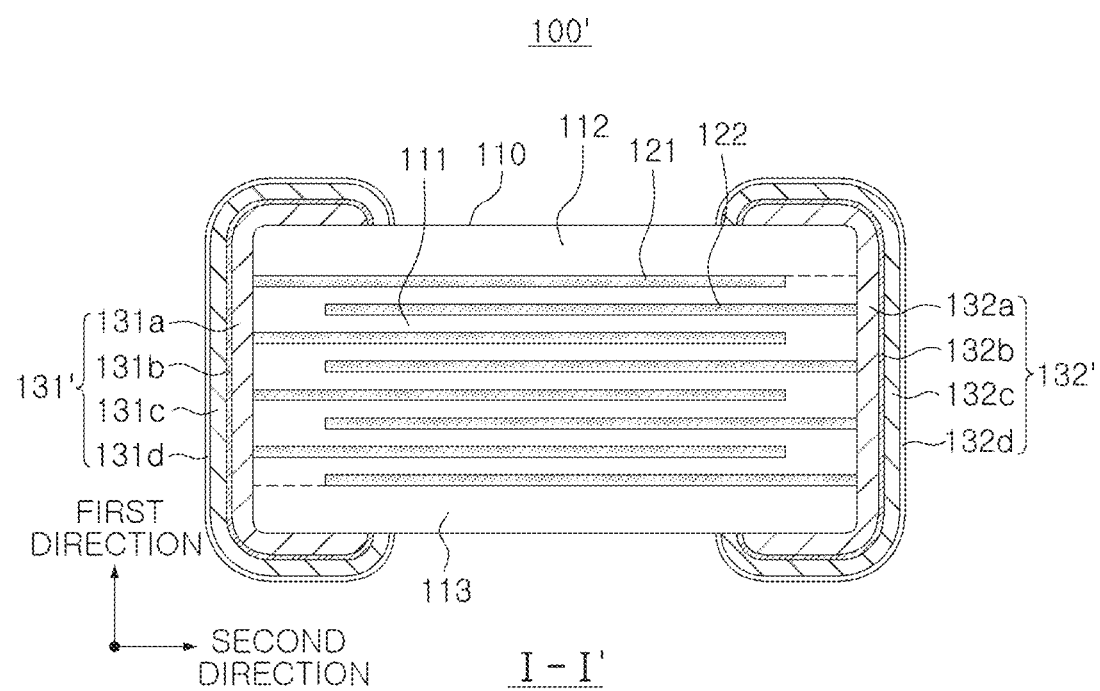
FIG. 6 is a cross-sectional view taken along line I-I' of a multilayer electronic component according to a modified example of FIG. 1.

FIG. 6 is a schematic cross-sectional view taken along line I-I' of a multilayer electronic component according to a modified example of FIG. 1. Referring to FIG. 6, plating layers 131d and 132d disposed on the third electrode layers 131c and 132c may be further included.

The plating layers 131d and 132d serve to improve mounting characteristics. A type of the plating layers 131d and 132d is not particularly limited, and may be a plating layer including at least one of Ni, Sn, Pd, and alloys thereof, and may be formed of a plurality of layers.

As a specific example, the plating layers 131d and 132d may be Sn plating layers. Generally, the plating layer has a two-layer structure in which a Sn plating layer is disposed on a Ni plating layer. According to the present disclosure, since the third electrode layer includes Ni, sufficient mountability may be ensured even if only the Sn plating layer is disposed, and since the second electrode layer may serve as a barrier, solder may be prevented from penetrating into the first electrode layer.

Figure 7:
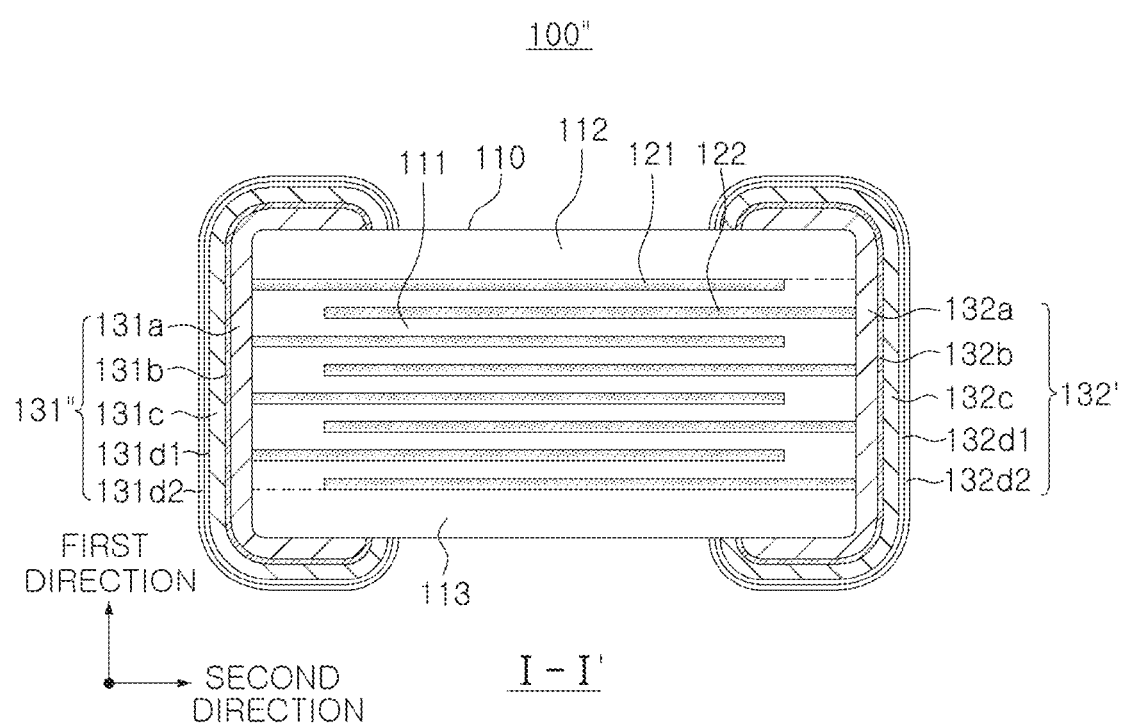
FIG. 7 is a cross-sectional view taken along line I-I' of a multilayer electronic component according to another modified example of FIG. 1.

However, it is not necessary to limit the structure to a structure in which only the Sn plating layer is disposed, and as shown in FIG. 7, the plating layer may include Ni plating layers 131d1 and 132d1 disposed on the third electrode layer and Sn plating layers 131d2 and 132d2 disposed on the Ni plating layers.

A size of the multilayer electronic component 100 does not need to be particularly limited.

However, in order to achieve both miniaturization and high capacitance, it is necessary to increase the number of stacks by reducing the thickness of the dielectric layer and the internal electrodes, the reliability and insulation resistance improvement effect according to the present disclosure may be more remarkable in the multilayer electronic component 100 having a size of 1005 (length×width, 1.0 mm×0.5 mm) or less.

Therefore, in consideration of manufacturing errors and the size of external electrodes, the reliability improvement effect according to the present disclosure may be more remarkable when the length of the multilayer electronic component 100 is 1.1 mm or less and the width is 0.55 mm or less. Here, the length of the multilayer electronic component 100 means a maximum size of the multilayer electronic component 100 in the second direction, and the width of the multilayer electronic component 100 means a maximum size of the multilayer electronic component 100 in the third direction.

Experimental Example 1

Table 1 below illustrates the measurement and evaluation of insulation resistance characteristics, solder bath test, and ESR, while varying the thickness of the second electrode layer.

As described above, the average thickness of the second electrode layer was measured by observing a cross-section cut in the first and second directions at the center in the third direction, and is a value obtained by averaging thicknesses of the second electrode layer measured at five points at equal intervals disposed on the capacitance forming portion Ac in the second direction. In addition, it was confirmed that the maximum peak of the second electrode layer appeared between the maximum peak of Cu and the maximum peak of Ni during XRD analysis, and it was confirmed that the second electrode layer included the Cu—Ni alloy.

For insulation resistance characteristics, 20 sample chips for each test number were prepared, a voltage of 4V was applied for 12 hours at a temperature of 85° C. and a relative humidity of 85%, and a sample in which the insulation resistance value was lowered to 1/10 of an initial value was determined as NG, and [Number of samples determined as NG/total number of samples] is described.

For the solder bath test, 200 sample chips for each test number were prepared, transferred to a substrate with heat-resistant tape, and then dipped in flux and cleaned. Thereafter, the substrate was completely immersed in a solder bath to wet lead, and a case in which a de-wetting area of a head of an electrode corresponds to any one of i), ii) and iii) below was determined as NG, and [Number of the sample determined as NG]/total number of samples] is described.
  i) When the de-wetting area exceeds 20% of a total area of the head of the external electrode
  ii) When ceramic or Cu exposure of a de-wetting part is more than 10% of the total area
  iii) If the de-wetting part is an edge part, when the de-wetting part is more than ½ (50%) of the de-wetting area For flexural strength, 30 sample chips for each test number were prepared and mounted on a substrate for a flexural strength test, and a sample in which a chip was destroyed when the amount of change in a PCB curve was pressed up to 6 mm by a force applied using strength testing equipment (Tira) at a rate of 0.5 mm/s was determined as NG, and [Number of samples determined as NG/total number of samples] is described.

For ESR, 400 sample chips for each test number were prepared and mounted on an ESR substrate, reflow was conducted at 260 degrees, an ESR frequency suitable for a chip design was input using an automated facility, measurement was performed and a sample not satisfying SPEC (mΩ) according to chip capacity was determined as NG, and [Number of samples determined as NG/total number of samples] is described.

TABLE 1

| Test Number | Average thickness of second electrode layer | Insulation resistance characteristic | Solder bath test | Flexural strength | ESR |
|---|---|---|---|---|---|
| 1* | 0.8 μm | 15/20 | 7/200 | 0/30 | 0/400 |
| 2 | 1 μm | 0/20 | 0/200 | 0/30 | 0/400 |
| 3 | 5 μm | 0/20 | 0/200 | 0/30 | 0/400 |
| 4 | 10 μm | 0/20 | 0/200 | 0/30 | 0/400 |
| 5* | 15 μm | 0/20 | 0/200 | 2/30 | 4/400 |

*Comparative Example

In the case of Test No. 1, since the average thickness of the second electrode layer is thin, less than 1 μm, it can be confirmed that the insulation resistance characteristics and solder bath test evaluation results are inferior.

In the case of Test No. 5, since the average thickness of the second electrode layer exceeds 10 μm, it can be confirmed that the flexural strength and ESR evaluation results are inferior.

Meanwhile, in the case of Test numbers 2 to 4, in which the average thickness of the second electrode layer is 1 μm or more and 10 μm or less, it can be confirmed that the evaluation results of insulation resistance characteristics, solder bath test, the flexural strength, and ESR are all excellent.

Experimental Example 2

An experiment was conducted to compare effects of preventing hydrogen penetration of the conventional example in which the external electrode included only a fired electrode including Cu and glass and the inventive example having the structure of the external electrodes according to the present disclosure.

Hydrogen analyzer equipment of Horiba was used, and the measurement conditions were Wait Time 5 s, Integration Time 75 s, Comparator Level 0.1%, and Comparator Wait Time 40 s.

Samples chips of the conventional example by the number so that a total weight was 1 g was loaded to the hydrogen analyzer equipment, quantitative analysis of hydrogen detected by rapidly increasing a temperature to 2000° C. or higher was performed, and quantitative analysis of hydrogen detected under the same conditions was also carried out in the case of the inventive example and described in Table 2 below.

TABLE 2

| Classification | Inventive example | Conventional example |
|---|---|---|
| Total weight | 1 g | 1 g |
| H ppm | 2.89 | 11.2 |

In the case of the inventive example, a total amount of detected hydrogen was 2.89 ppm, which was significantly lower than that of the conventional example. This means that, in the case of the inventive example, the amount of residual hydrogen in the plating chip was significantly reduced, as compared to the conventional example due to the hydrogen penetration prevention effect due to the alloy layer, and the hydrogen penetration prevention effect of the inventive example may be confirmed.

As one of several effects of the present disclosure, since the external electrodes have the first electrode layer, the second electrode layer, and the third electrode layer, and the second electrode layer includes Cu and Ni, the reliability of the multilayer electronic component may be improved.

While exemplary embodiments have been shown and described above, it will be apparent to those skilled in the art that modifications and variations could be made without departing from the scope of the present disclosure as defined by the appended claims.

What is claimed is:
1. A multilayer electronic component comprising:
   a body including a dielectric layer and internal electrodes; and
   external electrodes disposed on the body and connected to the internal electrodes,
   wherein the external electrodes include a first electrode layer disposed on the body and including Cu and glass, a second electrode layer disposed on the first electrode layer and including Ni and Cu, and a third electrode layer disposed on the second electrode layer and including Ni and glass.
2. The multilayer electronic component of claim 1, wherein an average thickness of the second electrode layer is 1 μm or more and 10 μm or less.

3. The multilayer electronic component of claim 1, wherein the sum of mole numbers of a Ni atom and a Cu atom over a total mole number of atoms constituting the second electrode layer is 0.95 or more.

4. The multilayer electronic component of claim 1, wherein the second electrode layer includes a Cu—Ni alloy.

5. The multilayer electronic component of claim 4, wherein the Cu—Ni alloy is one or more of $Cu_{0.3}Ni_{0.7}$, $Cu_{0.5}Ni_{0.5}$, $Cu_{0.7}Ni_{0.3}$, and $Cu_{0.9}Ni_{0.1}$.

6. The multilayer electronic component of claim 4, wherein the second electrode layer has a maximum peak existing between a maximum peak of Cu and a maximum peak of Ni when XRD-analyzed.

7. The multilayer electronic component of claim 1, wherein the second electrode layer includes substantially a Cu—Ni alloy.

8. The multilayer electronic component of claim 1, wherein an alloy including Cu and Ni is disposed in a region in which the first electrode layer and the internal electrode are in contact with each other.

9. The multilayer electronic component of claim 1, wherein an average of E2/E1 is 0.9 or more, in which E1 is an overall length of the first electrode layer and E2 is an overall length of the second electrode layer in a boundary between the first electrode layer and the second electrode layer in a cross-section of the multilayer electronic component in first and second directions.

10. The multilayer electronic component of claim 1, further comprising a plating layer disposed on the third electrode layer.

11. The multilayer electronic component of claim 10, wherein the plating layer is a Sn plating layer.

12. The multilayer electronic component of claim 10, wherein the plating layer includes a Ni plating layer disposed on the third electrode layer and a Sn plating layer disposed on the Ni plating layer.

13. The multilayer electronic component of claim 1, wherein an average thickness of the third electrode layer is thicker than an average thickness of the first electrode layer.

14. The multilayer electronic component of claim 13, wherein the average thickness of the third electrode layer is 1.1 times or more and 1.5 times or less of the average thickness of the first electrode layer.

15. The multilayer electronic component of claim 1, wherein an average thickness of the internal electrodes is 0.35 µm or less.

16. The multilayer electronic component of claim 1, wherein an average thickness of the dielectric layer is 0.35 µm or less.

17. A multilayer electronic component comprising:
a body including a dielectric layer and internal electrodes; and
external electrodes disposed on the body and connected to the internal electrodes,
wherein the external electrodes include a first electrode layer disposed on the body and including Cu, a second electrode layer disposed on the first electrode layer and including Ni and Cu, and a third electrode layer disposed on the second electrode layer and including Ni and glass.

18. The multilayer electronic component of claim 17, wherein the first and third electrode layers are fired layers.

19. The multilayer electronic component of claim 18, wherein the first electrode layer further includes glass, and an average thickness of the second electrode layer is 1 µm or more and 10 µm or less.

20. The multilayer electronic component of claim 17, wherein the first and third electrode layers do not contain Sn, resin, or both.

* * * * *